United States Patent
Takei

(10) Patent No.: US 8,411,169 B2
(45) Date of Patent: *Apr. 2, 2013

(54) IMAGE PROCESSING APPARATUS AND IMAGE PROCESSING METHOD

(75) Inventor: Hirofumi Takei, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 12/628,029

(22) Filed: Nov. 30, 2009

(65) Prior Publication Data

US 2010/0073511 A1 Mar. 25, 2010

Related U.S. Application Data

(63) Continuation of application No. 11/404,469, filed on Apr. 13, 2006, now Pat. No. 7,630,005.

(30) Foreign Application Priority Data

May 17, 2005 (JP) .................................. 2005-144556

(51) Int. Cl.
*H04N 5/262* (2006.01)

(52) U.S. Cl. .................. 348/239; 348/222.1; 348/231.7; 348/231.8; 348/231.9

(58) Field of Classification Search ........................ None
See application file for complete search history.

(56) References Cited

U.S. PATENT DOCUMENTS

| | | | |
|---|---|---|---|
| 5,687,011 A * | 11/1997 | Mowry | 358/527 |
| 6,987,535 B1 * | 1/2006 | Matsugu et al. | 348/239 |
| 7,065,255 B2 * | 6/2006 | Chen et al. | 382/260 |
| 2003/0043276 A1 * | 3/2003 | Tojo | 348/207.99 |
| 2003/0174216 A1 * | 9/2003 | Iguchi et al. | 348/223.1 |
| 2004/0207730 A1 * | 10/2004 | Imai et al. | 348/207.1 |
| 2005/0099515 A1 * | 5/2005 | Tsuruoka | 348/241 |
| 2006/0256853 A1 | 11/2006 | Schlockermann et al. | |

FOREIGN PATENT DOCUMENTS

| | | |
|---|---|---|
| JP | 2004-134950 A | 4/2004 |
| JP | 2005-080301 A | 3/2005 |

* cited by examiner

*Primary Examiner* — James M Hannett
*Assistant Examiner* — Yih-Sien Kao
(74) *Attorney, Agent, or Firm* — Canon USA Inc. IP Division

(57) ABSTRACT

At least one exemplary embodiment is directed to an image processing apparatus that generates control information related to the generation of image data executed in shooting processing, and generates component information of a special effect, for example, such as a film grain, based on the control information.

12 Claims, 7 Drawing Sheets

IMAGE PROCESSING APPARATUS AND IMAGE PROCESSING METHOD

CROSS-REFERENCE TO RELATED APPLICATION

This is a continuation of application Ser. No. 11/404,469, filed Apr. 13, 2006, which claims the benefit of priority to Japanese Application No. 2005-144556, filed May 17, 2005, the entire contents of which are incorporated by reference herein.

BACKGROUND OF THE INVENTION

1. Field of the Invention

The present invention relates to a technology for performing a special effect processing for captured images.

2. Description of the Related Art

Some conventional video cameras can perform various special effects on a shot image for reproduction and display. Among these processes, one can perform special effects, in which an image shot by a television camera (e.g., video camera) is mixed with fine and particulate noises characteristic of a film and turned into an image as if it were taken by a picture film camera. This special effect is generally referred to as "film grain." In the following description, a fine and particulate noise component characteristic of the film added to a camera image is referred to as a "film grain component." A process for adding a film grain component to an image is referred to as "film grain processing." Japanese Patent No. 3110763 discusses an image shot by a television camera that is subjected to the film grain processing.

On the other hand, the video camera discussed in Japanese Patent Application Laid-Open No. 11-205754 records a shot image data and information attached thereto regarding the special effect given to the image on a recording medium. When the image data is reproduced, a special effect processing is performed based on the attached information to reproduce the image data. This type of video camera, when recording a shot image, records the image as it is without performing a special effect to the image signal, and records information regarding the special effect as attached information. Then, at the reproducing time, this video camera performs the special effect processing for the reproduced image based on the attached information regarding the special effect, and displays the image.

However, when the film grain processing is performed to the image shot by the video camera, there can be difficulties.

For example, in the case of the video camera discussed in Japanese Patent No. 3110763, the film grain effect sometimes does not emerge appropriately depending on a state of shooting. That is, when an object is dark, the camera unit electrically amplifies signals, so that a lot of random noises are naturally included in the image signals. In that state, if the film grain component is further added, the noise component of the image can become too large, which can cause a degraded image.

On the other hand, some conventional cameras are provided with a function of automatically adjusting an output ration of R (red), G (green), and B (blue) to obtain a stabilized and favorable color reproduction even when a color temperature is changed. That is a so-called white balance function.

Usually, an adjustment of the white balance is performed such that a white object looks white, but there is also a case in which shooting is performed by shifting the adjustment of the white balance a little. For example, in the scene under an incandescent lamp or a sunset color, in some cases the white balance is intentionally shifted a little bit toward a red direction. Thus, an overall image plane is turned into a reddish and warm atmosphere, under which condition shooting is performed. Further, when shooting is performed in a sunrise color or in the shade, there is a case where the white balance is shifted a little bit toward a blue direction. Thus, an overall image plane is turned into a bluish atmosphere, under which condition shooting is performed.

Thus, in some cases, if the film grain component that does not have any deviation in R (red), G (green), and B (blue) is added, the reddish atmosphere or the bluish atmosphere thins out. Even when a film grain processing is carried out in a system performing the special effect based on the attached information at the reproducing time as discussed in Japanese Patent Application Laid-Open No. 11-205754, there is a possibility that such a phenomenon similarly appears.

SUMMARY OF THE INVENTION

At least one exemplary embodiment can easily accomplish a special effect corresponding to a condition of an exposure control and a white balance control of image data.

In one exemplary embodiment, an image processing apparatus includes: a shooting processing device configured to execute shooting processing which includes shooting an image of an object and generating an image data of the object; a control information generating device configured to generate control information showing a control content relating to the shooting processing executed by the shooting processing device; and a generating device configured to generate special effect information based on the control information.

Further features of the present invention will become apparent from the following detailed description of exemplary embodiments with reference to the attached drawings.

BRIEF DESCRIPTION OF THE DRAWINGS

The accompanying drawings, which are incorporated in and constitute apart of the specification, illustrate exemplary embodiments of the invention and, together with the description, serve to explain the principles of the invention.

DETAILED DESCRIPTION OF THE EXEMPLARY EMBODIMENTS

Figure 1:
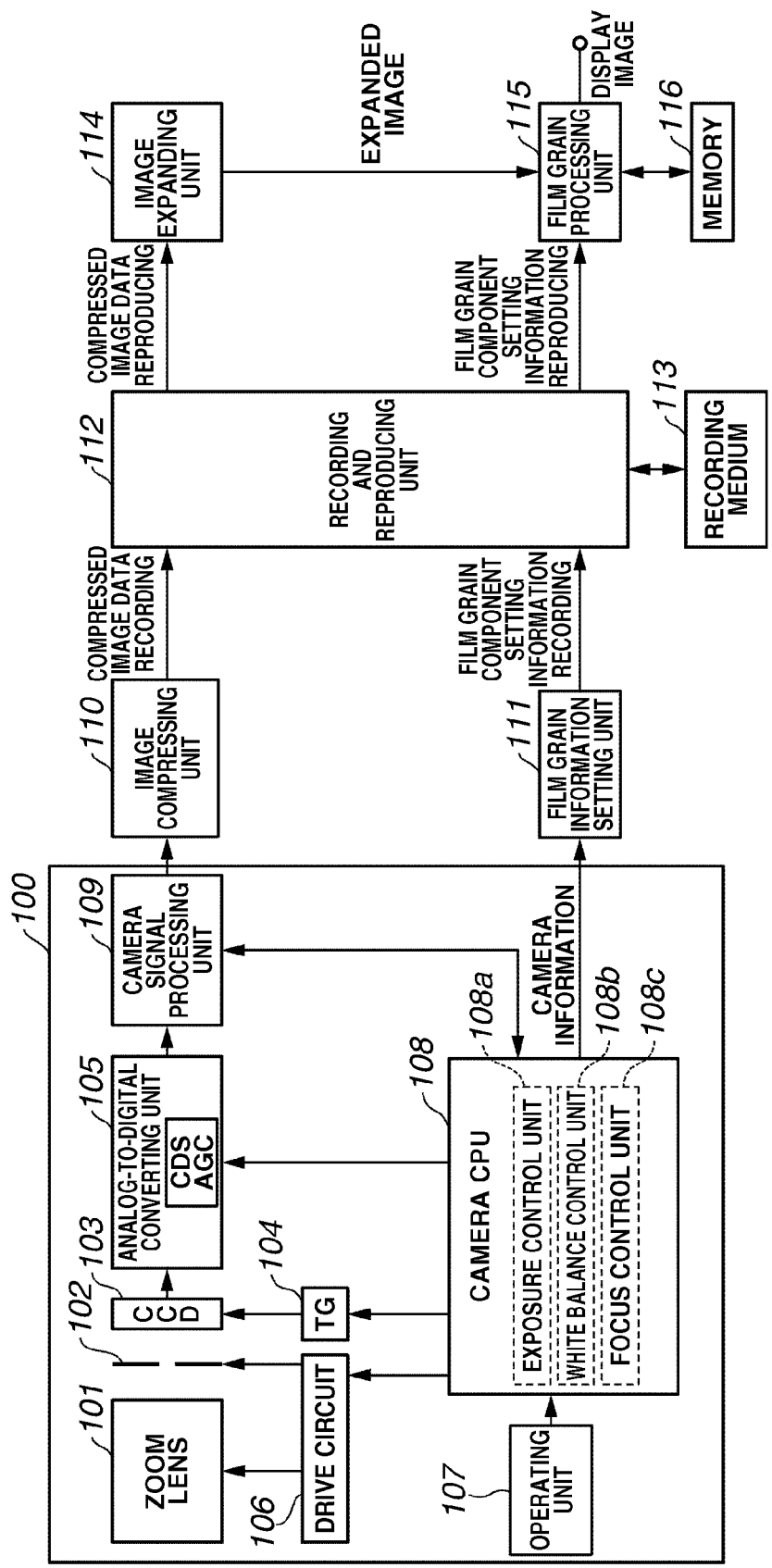
FIG. 1 is a block diagram showing a structure of an image recording and reproducing apparatus according to a first exemplary embodiment of the present invention.

The following description of at least one exemplary embodiment is merely illustrative in nature and is in no way intended to limit the invention, its application, or uses.

Processes, techniques, apparatus, and materials as known by one of ordinary skill in the relevant art may not be discussed in detail but are intended to be part of the enabling description where appropriate, for example the fabrication of lens elements of the zoom lens, and fabrication of a drive circuit to drive the zoom lens. Additionally, image pick-up devices such as a CCD are used in the examples, however exemplary embodiments are not limited to CCDs as the image pickup device, and other devices (e.g., CMOS device) as known by one of ordinary skill in the relevant arts and equivalents can be used.

In all of the examples illustrated and discussed herein any specific values, for example the level and granularity of R (Red), G (Green) and B (Blue) components in a total film grain component, should be interpreted to be illustrative only and non limiting. Thus, other examples of the exemplary embodiments could have different values.

Notice that similar reference numerals and letters refer to similar items in the following figures, and thus once an item is defined in one figure, it may not be discussed for following figures.

Exemplary embodiments of the invention will be described in detail below with reference to the drawings.

First Exemplary Embodiment

FIG. 1 is a block diagram showing a structure of an image recording and reproducing apparatus capable of shooting a dynamic picture image according to a first exemplary embodiment of the present invention. In at least one exemplary embodiment, a special effect is described as an example of a filming grain processing.

An operation, when recording, is carried out in the image recording and reproducing apparatus of FIG. 1, and will be described first. An optical image from an object is subjected to zoom and focus adjustments by a zoom lens 101. Then, a light quantity is adjusted by a diaphragm 102, and an image is formed on an image capture device (e.g., CCD 103). The CCD 103 is driven at a predetermined speed by a timing generator (hereinafter referred to as TG) 104. The signals from the CCD 103 are subjected to correlated double sampling (CDS) and automatic gain control (AGC) as well as analog-to-digital conversion. A drive circuit 106 drives the zoom lens 101 and the diaphragm 102. An operating unit 107 includes switches for an operation to determine whether a film grain processing is executed for the image, and other various operations of a camera unit 100 (shooting processing device). A camera CPU 108 controls and consolidates the functions of the whole camera unit 100. An image data that is analog-to-digitally converted at an analog-to-digital converting unit 105 is inputted to a camera signal processing unit 109. The camera signal processing unit 109 performs a color correction processing, a γ correction, a white balance adjustment, and other related or equivalent image corrections and/or error reductions as known by one of ordinary skill in the relevant art, and outputs camera image data. The camera unit 100 is configured by the above described units 101 to 109.

The camera CPU 108 (an example of a control information generating device) includes a camera control module performing various controls of the camera unit 100 in the image recording and reproducing apparatus.

An exposure control unit 108a in the camera CPU 108 controls the diaphragm 102, a shutter speed and a gain control (AGC) of CCD 103, and appropriately controls an exposure level of the image signals. The exposure control signals from an exposure control unit 108a are outputted to the drive circuit 106, the TG 104, and the analog-to-digital converting unit 105.

A white balance control unit 108b obtains color temperature information of the object from R (red), G (green), and B (blue) components in the image signals and a color temperature sensor (not shown), and outputs white balance control signals for controlling the white balance of the image to the camera signal processing unit 109.

A focus control unit 108c outputs lens control signals that control the zoom lens 101, and adjust focusing and zooming, to the drive circuit 106.

The control information outputted from the control module such as the units 108a to 108c are inputted to a film grain information setting unit 111 (an example of a generating device and a setting information generating unit) as camera information. The details of the film grain information setting unit 111 will be described later.

Next, the camera image data outputted from the camera unit 100 is compressed according to a compressing method, for example MPEG-2 and other related or equivalent compression methods as known by one of ordinary skill in the relevant art, by an image compressing unit 110, and is outputted to a recording and reproducing unit 112 as compressed image data. Also the film grain component setting information is inputted to the recording and reproducing unit 112 from the film grain information setting unit 111. In the recording and reproducing unit 112, the inputted and compressed image data and the film grain component setting information are recorded on a recording medium 113.

As the recording medium 113, a built-in type hard disk or a detachable attachable optical disc, a magneto-optical disk, a magnetic tape, a non-volatile memory card and other related or equivalent data storage apparatus and/or methods as known by one of ordinary skill in the relevant art can be used.

Next, the operation when the image recording and reproducing apparatus reproduces an image will be described. At the time of reproduction, the recording and reproducing unit 112 reproduces the compressed image data and film grain component setting information from the recording medium 113.

The reproduced compressed image data is expanded in an image expanding unit 114, and is converted into an expanded image of a base band. The film grain component setting information reproduced from the recording medium 113 is inputted to a film grain processing unit 115 (an example of a special effect processing device), and the film grain processing is performed corresponding to the film grain component setting information for the expanded image. The image subjected to the film grain processing is outputted to an outside monitor and other related or equivalent display apparatus and/or methods as known by one of ordinary skill in the relevant art as a display image. A memory 116 can be used for the film grain processing, for example, for storing the film grain component.

Figure 2:
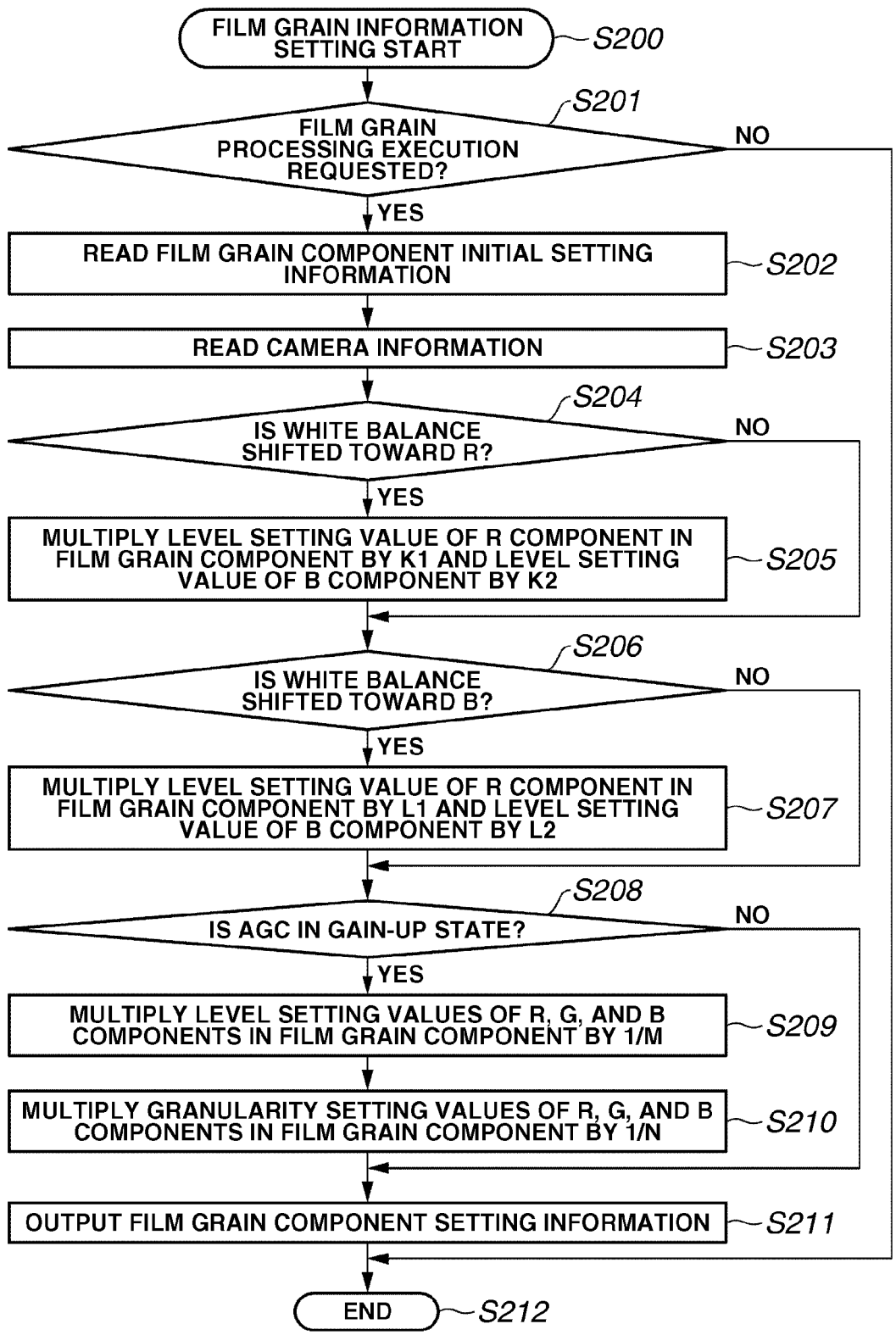
FIG. 2 is a flowchart showing an operation of a film grain information setting unit in the first exemplary embodiment.

Next, the operation of the film grain information setting unit 111 will be described in detail by referring to the flowchart of FIG. 2. First, the processing starts at step S200, it is then determined at step S201 whether the film grain processing execution has been requested from the operating unit 107. In the case where the film grain processing execution is requested, at step S202, the film grain component initial setting information is read (e.g., from a ROM table stored inside a ROM (not shown)). The film grain component initial setting information includes a level setting value for setting a strength of each component of R (red), G (green) and B (blue) in the film grain component and information such as granularity setting value for setting a size of particle of each component.

Next, at step S203, the camera information relating to the exposure control and the white balance control is read from the camera unit 100. At step S204, based on the camera information relating to the white balance control, it is determined whether the white balance is shifted toward R (red). In the case where the white balance is shifted toward R (red) at step S204, the level setting value for setting the strength of the R (red) component is multiplied by K1, and the level setting value for setting the strength of the B (blue) component is multiplied by K2 at step S205.

Here, when K1 and K2 have a relationship shown by the following formulas (1) and (2), the strength of the R (red) component can be enhanced, and the strength of the B (blue) component can be lowered. That is, when it is determined that the white balance is shifted toward the R (red), the film grain component setting information can be corrected and/or adjusted to shift the component of the film grain toward the R (red).

$$K1 > 1.0 \quad (1)$$

$$K2 < 1.0 \quad (2)$$

Next, at step S206, based on the camera information relating to the white balance control, it is determined whether the white balance is shifted toward the B (blue). In the case where it is determined at step S206 that the white balance is shifted toward the B (blue), the level setting value for setting the strength of the R component in the film grain component is multiplied by L1 and the level setting value for setting the strength of the B component is multiplied by L2 at step S207.

Here, when L1 and L2 have a relationship shown by formulas (3) and (4), the strength of the R (red) component can be lowered, and the strength of the B (blue) component can be enhanced. That is, when it is determined that the white balance is shifted toward the B (blue), the film grain component setting information can be corrected and/or adjusted to shift the component of the film grain toward the B (blue).

$$L1 \leq 1.0 \quad (3)$$

$$L2 \geq 1.0 \quad (4)$$

Next, at step S208, based on the camera information relating to an amplifier gain of the exposure control and the camera signal processing, it is determined whether an amplification factor of the AGC is large or in a so-called gain up state. When it is determined that the AGC is in the gain-up state at step S208, the level setting values for setting the strength of the R (red), G (green), and B (blue) components in the film grain component are all multiplied by 1/M at step S209.

Here, when M has a state shown by the following formula (5), if it is determined as being in a gain-up state, the film grain component setting information can be corrected and/or adjusted to lower the strength of all film grain components. On the other hand, instead of changing each strength of the R (red), G (green), and B (blue) components individually, even if there is the film grain component information relating to a Y (luminance) component, that information can be similarly multiplied by 1/M.

$$M > 1.0 \quad (5)$$

Further, when it is determined at step S208 that the AGC is in a gain-up state, at step S210, the granularity (size of noise particles) setting value in the R, G, and B components in the film grain component can all be multiplied by 1/N.

Here, when N has a state shown by the following formula (6), if it is determined as being in a gain-up state, the film grain component setting information can be corrected and/or adjusted to decrease the granularity of the whole film grain component.

$$N > 1.0 \quad (6)$$

After that, at step S211, the film gain component setting information that is appropriately corrected and/or adjusted based on the camera information, is outputted to the recording and reproducing unit 112, and can be recorded in the recording medium 113 together with the image data. At step S201, in the case where the film grain processing execution is not requested, the film grain component setting information is not outputted to the recording and reproducing unit 112 and the processing is terminated (step S212). In this case, the compressed image data can be recorded in the recording medium 113. In this manner, in the image recording and reproducing apparatus of FIG. 1, while performing a shooting operation (and recording operation) of the object image, it is possible to set the film grain. In the case of such setting, the film grain component can be set according to the camera information at that moment.

Figure 3:
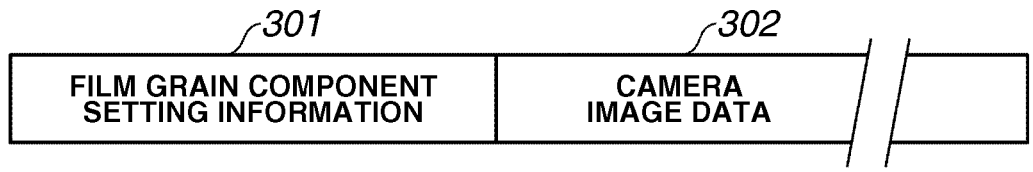
FIG. 3 is a schematic diagram of data recorded in a recording medium in the first exemplary embodiment.

In FIG. 3, a schematic diagram of the data recorded in the recording medium 113 is illustrated. In FIG. 3, reference numeral 301 denotes the film grain component setting information which is an example of special effect information. Reference numeral 302 denotes compressed camera image data. As illustrated in FIG. 3, the film grain component setting information 301 can be recorded in the recording medium 113 as the attached information on the camera image data 302. As one example of a recording form, the compressed camera image data and the film grain component setting information as the attached information can be recorded in a file form included in the same file.

Figure 4:
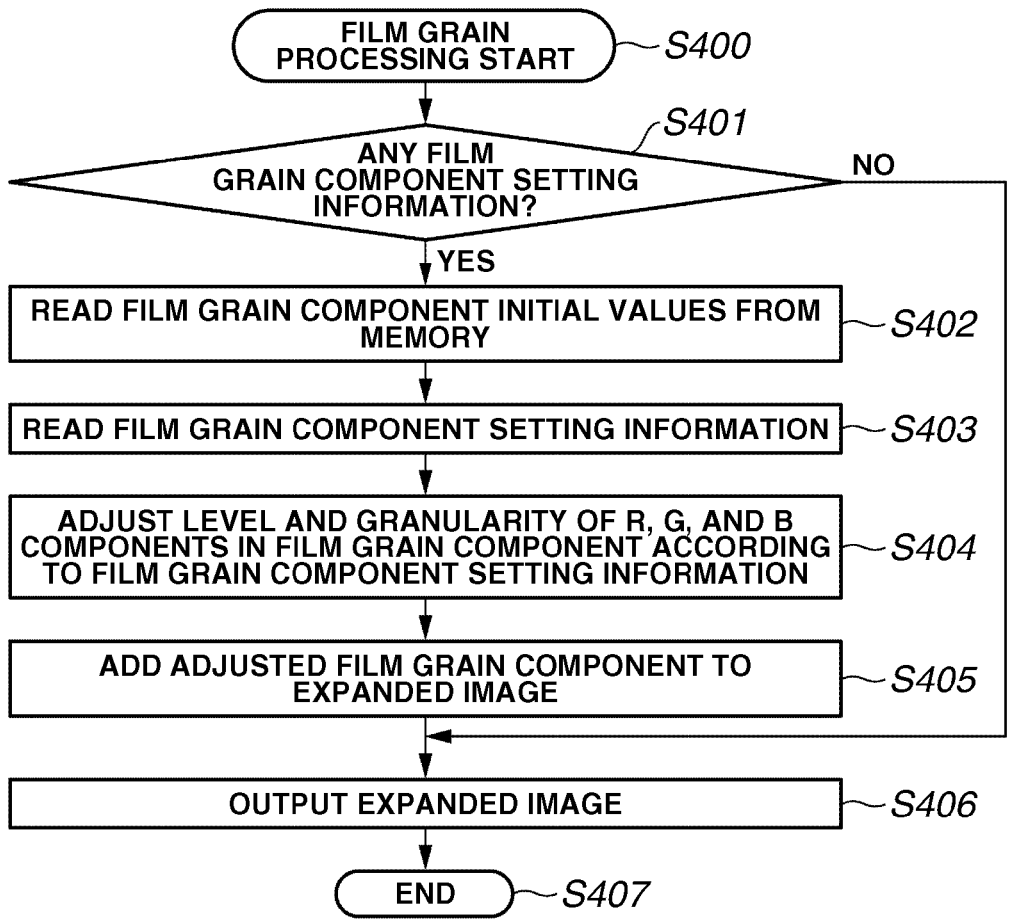
FIG. 4 is a flowchart showing a film grain processing operation at the reproducing time in the first exemplary embodiment.

Next, the operation of the film grain processing unit 115 at the reproducing time will be described in detail referring to FIG. 4. FIG. 4 is a flowchart showing one example of the film grain processing operation at the reproducing time in accordance with at least one exemplary embodiment.

First, the processing is started at step S400, and it is determined at step S401 whether the reproduced film grain component setting information is present. In the case where the film grain component setting information is present, at step S402, a processing for reading an initial value of the film grain component from the memory 116 is performed.

Figure 9:
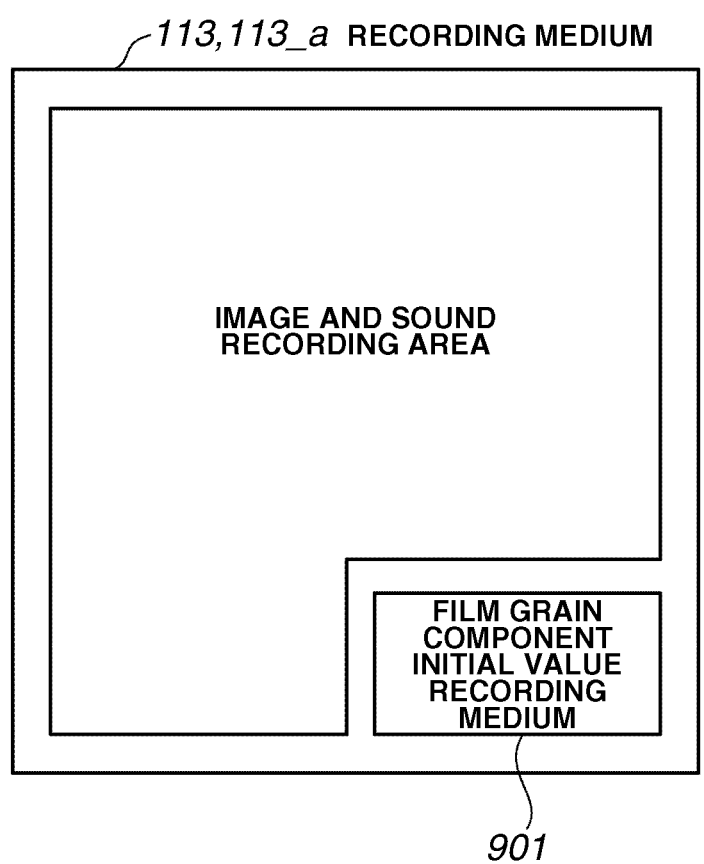
FIG. 9 is a view showing a film grain component recorded in a predetermined region of the recording medium.

Here, as the initial value of the film grain component, the memory 116 can store the random noise data prepared for the film grain in advance (e.g., and stored, for example as ROM data). Alternatively, as illustrated in 901 in FIG. 9, the initial value of the film grain component can be recorded in advance in a predetermined region of the recording medium 113. The initial value recorded in the recording medium 113 can be read at the beginning of the reproducing operation and dispatched into the memory 116. Otherwise, the initial value of the film grain component can be read from the outside of the image recording and reproducing apparatus through an interface (I/F) (not shown) and recorded in the memory 116.

Next, at step S403, the film grain component setting information is read. At step S404, according to the thus read film grain component setting information, the strength and granularity of the R (red), the G (green), the B (blue) components that constitute the film grain component are adjusted. At step S405, the adjusted film grain component is added to the expanded image, and at step S406, the expanded image is outputted as a display image. Then, the processing ends (step S407).

In the case where the setting information on the film grain component is not present at step S401, without adding the film grain component, the expanded image is outputted as the display image.

In the above described configuration and the operation, for example, in the case where the film grain processing is performed to a camera image capturing a dark object, the film grain component setting information is corrected and/or adjusted and recorded so as to control the film grain component according to the AGC gain. Hence, at the reproducing time, a rather slight amount of film grain component is added to the expanded image, so that the image is prevented from becoming an image, which can have a lot of noisy aspects. Further, also the strengths of the R (red) and the B (blue) components of the film grain component are corrected and/or adjusted according to the white balance and added to the image, and thus, it is possible to perform the film grain processing without harming the atmosphere of the image plane.

In the present exemplary embodiment, a description has been made on the case where the white balance has been shifted toward the R (red) and the B (blue). However, even in the case where the white balance is shifted toward other colors, the film grain component setting information can be corrected and/or adjusted as occasion demands, and the same effect can be obtained.

Further, the camera information relating to the exposure control may not be the gain up information only. For example, in the case of a slow shutter for exposing a CCD for a long period of time, according to the camera information showing the slow shutter, the film grain component setting information can be corrected and/or adjusted. In the present exemplary embodiment, while in FIG. 1, the image compressing unit 110 and the image expanding unit 114 are separated, this was only for simplification of the description. Consequently, even if the present invention is applied to a system which can perform compression and expansion of the image by one circuit block and one LSI, it belongs to the category of the present invention.

Further, in the present exemplary embodiment, the special effect of adding film grain is cited as an example. However, exemplary embodiments are not limited to only this special effect and many others can be included. For example, a special effect referred to as so-called "white fade processing" concerning the video camera, which gradually makes an image plane white. In this case, when it is determined by the white balance control information that there is a shift toward a low color temperature side (shifting toward the red side), the fade processing can be performed so as to make it slightly reddish during fading. Further, as another special effect, a so-called "mosaic processing", which divides the whole image into predetermined small regions to be averaged. In this case, when it is determined by the information of the amplifier gain that the AGC is in a gain up state, a processing can be performed such that the sizes of the small regions averaged by the mosaic processing become larger than usual. Such a modified example also belongs to the category of the present invention.

Second Exemplary Embodiment

Figure 5:
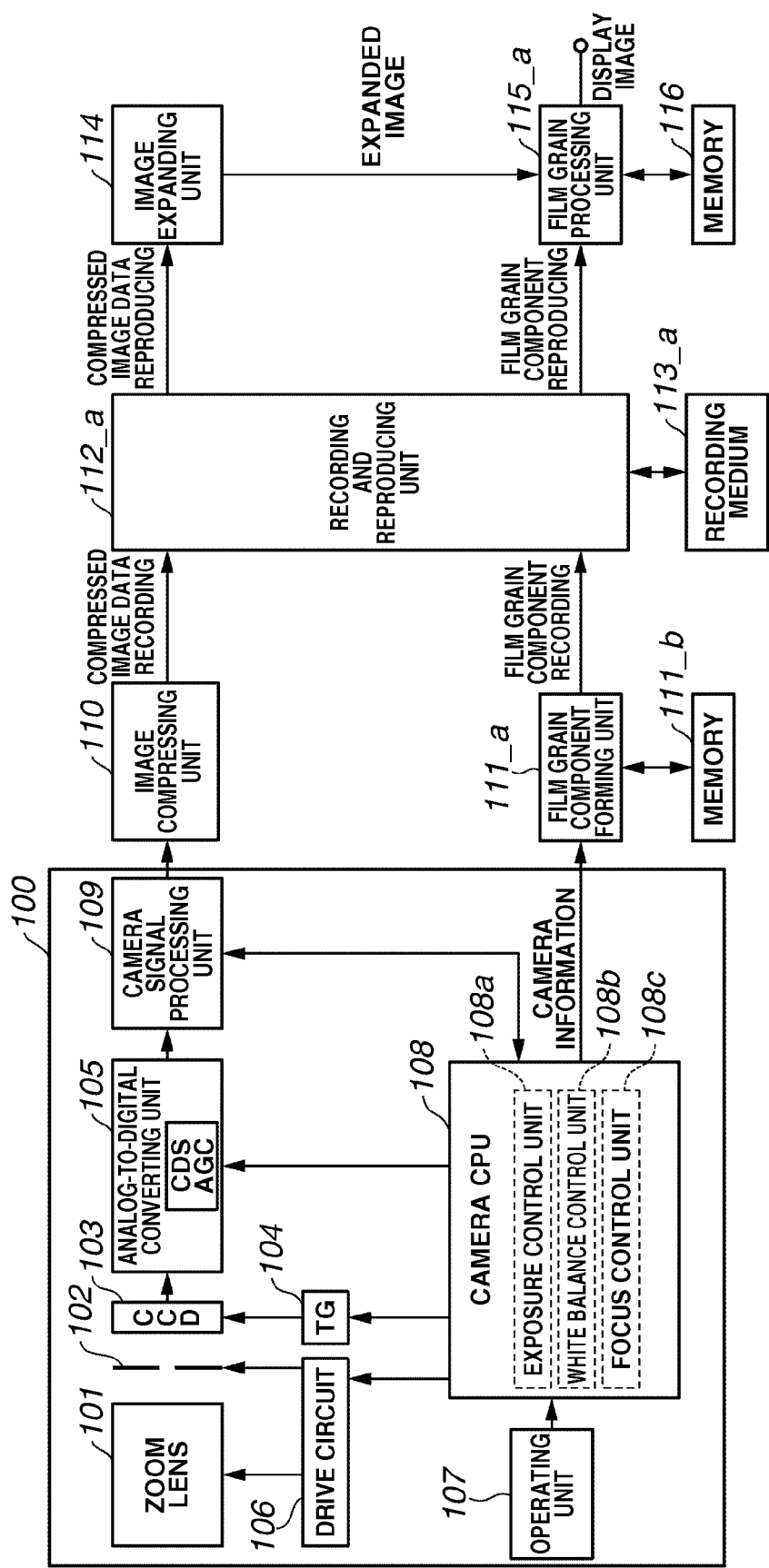
FIG. 5 is a block diagram showing a structure of the image recording and reproducing apparatus according to a second exemplary embodiment of the present invention.

FIG. 5 is a block diagram showing a structure of an image recording and reproducing apparatus according to a second exemplary embodiment of the present invention. The feature of the second exemplary embodiment is that film grain component setting information is not prepared from camera information at the recording time, but a film grain component itself corrected and/or adjusted by the camera information, and can be recorded in a recording medium together with image data. In FIG. 5, the operation of a camera unit 100 is the same as the first exemplary embodiment, and therefore, the description thereof will be omitted.

In FIG. 5, at the time of the recording operation, the camera information outputted from a camera unit 100 is inputted to a film grain component preparing unit 111a (an example of special effect component information generating unit and generating device). The details of the film grain component preparing unit 111a will be described later.

The camera image data outputted from the camera unit 100 is compressed according to a compressing method such as a MPEG-2 and other related or equivalent compression methods as known by one of ordinary skill in the relevant art by an image compressing unit 110, and is outputted to a recording and reproducing unit 112_a as compressed image data. Also the film grain component can be inputted to the recording and reproducing unit 112_a from a film grain information preparing unit 111_a. A memory 111_b can be used for film grain preparation data.

The recording and reproducing unit 112_a records the inputted compressed image data and the film grain component on a recording medium 113_a. The recording medium 113_a can be any type of recording medium for example, a built-in type hard disk or an optical disc, a magneto-optical disk, a magnetic tape, a non-volatile memory card and other related or equivalent recording mediums as known by one of ordinary skill in the relevant art.

The recording and reproducing unit 112_a reproduces the compressed image data from the recording medium 113_a at the time of reproduction. The reproduced compressed image data is expanded in an image expanding unit 114, and is converted into an expanded image of a base band. The film grain component reproduced is inputted to a film grain processing unit 115_a from the recording medium 113_a, and adds the reproduced film grain to the expanded image. The image subjected to the film grain processing is outputted to an outside display (e.g., monitor and other related or equivalent display apparatus as known by one of ordinary skill in the relevant art) as a display image. A memory 116 can be used for the film grain processing, and for temporarily storing the film grain component read from the recording medium 113_a.

Figure 6:
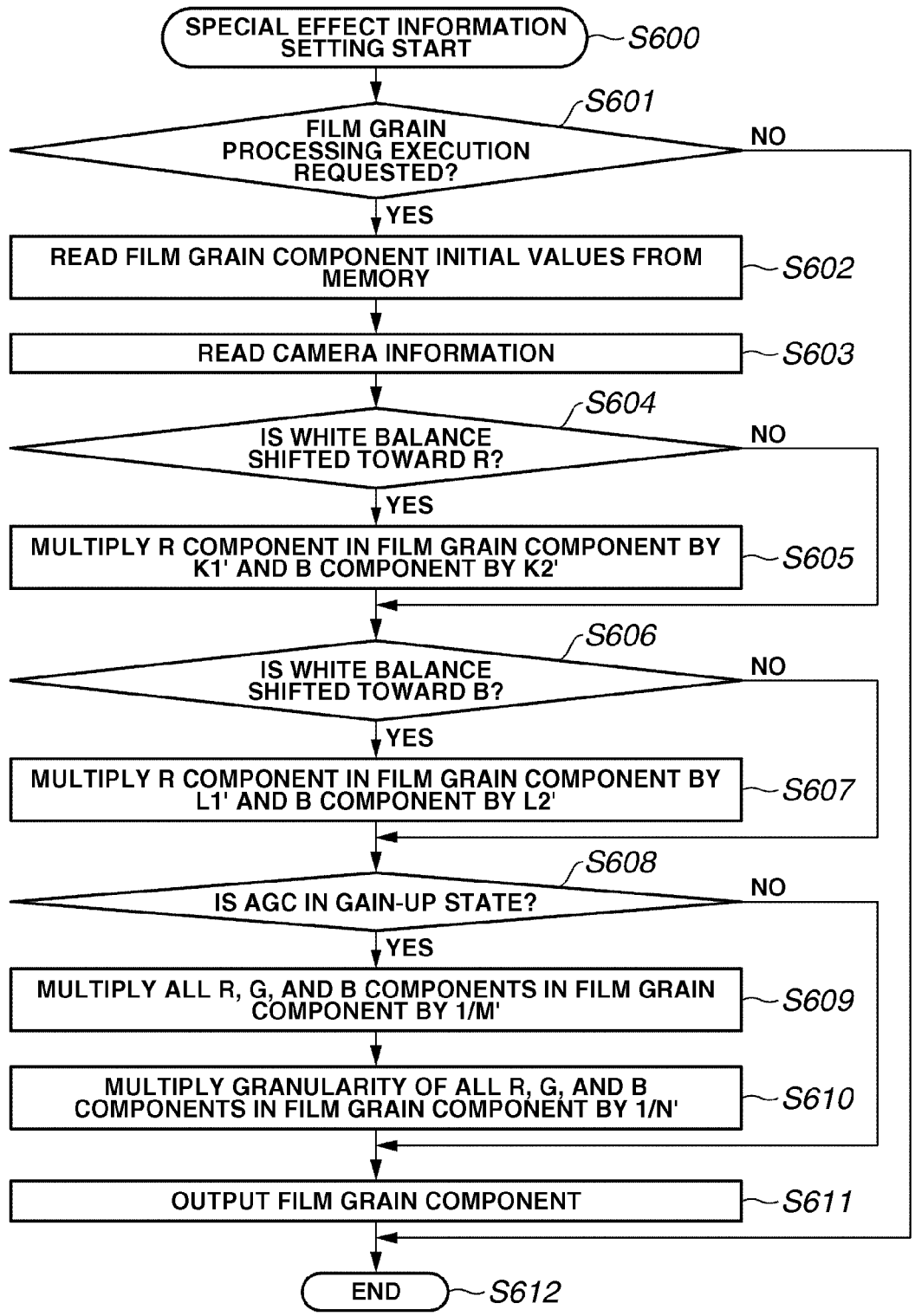
FIG. 6 is a flowchart showing the operation of a film grain preparation processing unit in the second exemplary embodiment.

Next, the operation of the film grain component preparing unit 111_a will be described by referring to the flowchart of FIG. 6.

First, the processing is started at step S600, it is then determined at step S601 whether a film grain processing execution is requested from an operating unit 107. In the case where the film grain processing execution is requested, at step S602, an initial value of the film grain component from the memory 111_b is read. Here, as the initial value of the film grain component, the memory 111_b can store the random noise data prepared for the film grain in advance as ROM data. Alternatively, as illustrated in 901 in FIG. 9, the initial value of the film grain component can be recorded in advance in a predetermined region of the recording medium 113-_a, and can be read into the memory 111_b at the beginning of the recording operation. Further alternatively, the initial value of the film grain component can be read from the outside of the image recording and reproducing apparatus through an interface (I/F) (not shown) and recorded in the memory 111_b.

Next, at step S603, the camera information relating to the exposure control and the white balance control is read from the camera unit 100. At step S604, based on the camera information relating to the white balance control, it is determined whether the white balance is shifted toward R (red).

In the case where the white balance is shifted toward R (red) at step S604, a level of the R component in the film grain component is multiplied by K1' and a level of the B component is multiplied by K2' at step S605.

Here, when K1' and K2' have a relationship shown by the following formulas (1) and (2), the strength of the R component can be enhanced, and the strength of the B component can be lowered. That is, when it is determined that the white balance is shifted toward the R (red), the component of the film grain can be shifted toward the R (red).

$$K1' > 1.0 \qquad (7)$$

$$K2' < 1.0 \qquad (8)$$

Next, at step S606, based on the camera information relating to the white balance control, it is determined whether the white balance is shifted toward the B (blue). In the case where it is determined at step S606 that the white balance is shifted toward the B (blue), the level of the R component in the film grain component is multiplied by L1', and the level of the B component is multiplied by L2' at step S607.

Here, when L1' and L2' have a relationship shown by formulas (9) and (10), the strength of the R component can be lowered, and the strength of the B component can be enhanced. That is, when it is determined that the white balance is shifted toward the B (blue), the component of the film grain can be also shifted toward the B (blue).

$$L1' > 1.0 \qquad (9)$$

$$L2' < 1.0 \qquad (10)$$

Next, at step S608, based on the camera information relating to an amplifier gain of the exposure control and the camera signal processing, it is determined whether an amplification factor of the AGC is large or in a so-called gain up state. When it is determined at step S608 that the AGC is in a gain-up state, the levels of the R (red), G (green), and B (blue) components in the film grain component are all multiplied by 1/M' at step S609.

Here, when M' has a relationship shown by the following formula (11), and it is determined to be in a gain-up state, the strength of all film grain components can be lowered. Even when the levels of the R (red), the G (green), and the B (blue) components are not changed individually, a level of a Y (luminance) component can be controlled and changed to 1/M' times.

$$M' > 1.0 \qquad (11)$$

Further, when it is determined at step S608 that the AGC is in a gain-up state, the granularity (size of noise particles) of the R, G, and B components in the film grain component are all multiplied by 1/N' at step S610.

Here, when N' has a relationship shown by the following formula (12), and it is determined to be in a gain-up state, the granularity of the whole film grain component can be made small.

$$N' > 1.0 \qquad (6)$$

After that, at step S611, the film gain component that is appropriately corrected and/or adjusted is outputted to the recording and reproducing unit 112_a, and can be recorded on the recording medium 113_a together with the image data. Then, the processing ends (step S612). At step S601, in the case where the film grain processing execution is not requested, the film grain component terminates the processing without being outputted to the recording and reproducing unit 112_a. In this case, the compressed image data can be recorded on the recording medium 113. In this manner, in the image recording and reproducing apparatus, it is possible to prepare the film grain component while performing a shooting operation (and recording operation) of the object image. Accordingly, the film grain component can be prepared according to the camera information at real time.

Figure 7:
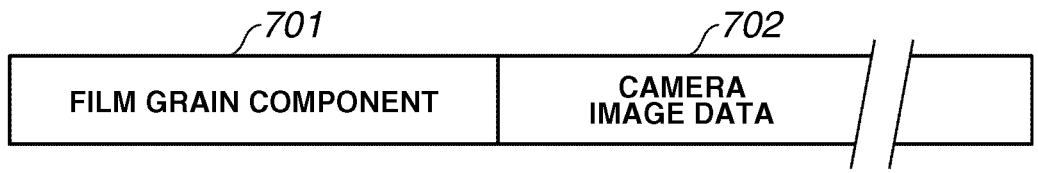
FIG. 7 is a schematic diagram of the data recorded in the recording medium in the second exemplary embodiment.

In FIG. 7 is shown a schematic diagram of the data recorded in the recording medium 113_a. In FIG. 7, reference numeral 701 denotes information showing a film grain, and reference numeral 702 denotes compressed camera image data. As illustrated in FIG. 7, the film grain component 701 can be added to the camera image data 702 and recorded in the recording medium 113_a. As one example of a recording form, the compressed camera image data and the film grain component information can be recorded in a file form included in the same file.

Next, the operation of a film grain processing unit 115_a at the reproducing time will be described in detail by using FIG. 8.

Figure 8:
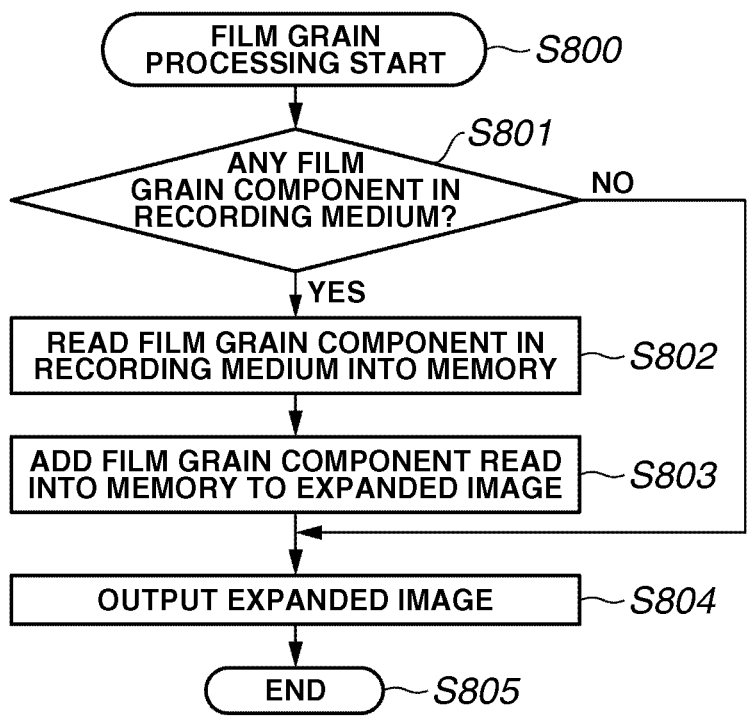
FIG. 8 is a flowchart showing the film grain processing operation at the reproducing time in the second exemplary embodiment.

FIG. 8 is a flowchart showing one example of the film grain processing operation at the reproducing time. First, when the processing is started at step S800, it is determined at step S801 whether the reproduced film grain component is present. In the case where the film grain component is present, at step S802, the film grain component is read from the recording medium 113_a into the memory 116. The film grain component read into the memory 116 is the information indicated in the film grain component 701 of FIG. 7.

Next, at step S803, the film grain component read in the memory 116 is added to the expanded image, and at step S804, the expanded image is outputted as a display image. Then, the processing ends (step S805).

In the case where the film grain component is not recorded at step S801, without adding the film grain component, the expanded image is outputted as the display image.

In the above described configuration and the operation, for example, in the case where the film grain processing is performed on a camera image capturing a dark object, the film grain component is corrected and/or adjusted and recorded so as to control the film grain component according to the AGC gain. Hence, at the reproducing time, the camera image is reproduced in which slight amount of film grain component is added to the image, so that the image is prevented from becoming an image, which can have a lot of noisy aspects as before. Further, also the strengths of the R (red) and the B (blue) components of the film grain component are corrected and/or adjusted according to the white balance, and thus, it is possible to perform the film grain processing without harming the atmosphere of the image plane.

In the present exemplary embodiment, the special effect with the film grain is cited as an example. However, exemplary embodiments are not limited to any particular special effect and others can be used, for example, the special effect referred to as so-called "white fade processing" concerning the video camera, which gradually makes an image plane white. In this case, when it is determined by the white balance control information as having shifted toward a low color temperature side (shifting toward the red side), the fade processing can be performed to make it slightly reddish during fading. Further, another special effect is the so-called "mosaic processing", which divides the whole image into predetermined small regions to be averaged. In this case, when it is determined by the information of the amplifier gain that the AGC is in a gain up state, a processing can be performed so that the sizes of the small regions averaged by the mosaic processing become larger than usual. Such a modified example also in encompassed in at least one exemplary embodiment.

Further, the present invention can be applied even when the signal processing or the image compression processing of the camera unit is executed by hardware or software processing using a computer to obtain the same effect. In this case, the program code itself of the software realizes the functions of the above described exemplary embodiments, and the program code itself and a device configured for supplying the program code to the computer, for example, the recording medium storing such program code constitutes at least one exemplary embodiment. A recording medium storing such program code can have many forms for example, a floppy (registered trade mark) disk, a hard disk, an optical disk, a magneto-optical disk, a magnetic tape, a non-volatile memory card, ROM and other related or equivalent recording mediums as known by one of ordinary skill in the relevant art.

Further, not only the described function is realized in the above described exemplary embodiments by executing the supplied program code by the computer, but even in the case where the functions shown in the above described exemplary embodiments are realized in corroboration with OS (operating system) in which that program code is working on the computer or other application soft, such program code is also included in the exemplary embodiments of the present invention.

Further, the present invention is also realized in the case where the supplied program code is stored in a feature expansion board or a memory provided in a feature expansion mechanism connected to the computer, and after that, based on the instructions of the program code, the CPU provided in the feature expansion board or the feature expansion unit performs apart or the whole of the actual processing, and by that processing, the functions of the above described exemplary embodiments are realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2005-144556 filed May 17, 2005, which is hereby incorporated by reference herein in its entirety.

What is claimed is:

1. An image processing apparatus, comprising:
   a shooting processing device configured to execute shooting processing which includes shooting an image of an object and generating an image data of the object;
   an obtaining device configured to obtain setting information of a noise additional component;
   a control information generating device configured to generate control information related to the shooting processing; and
   a generating device configured to generate a noise effect component with a strength based on the setting information and the control information.

2. The image processing apparatus according to claim 1, wherein the control information includes at least one of the information relating to an exposure control at the shooting processing, the information relating to signal amplifying processing of the image data; and the information relating to a white balance of the image data.

3. The image processing apparatus according to claim 1, further comprising a noise effect processing device configured to add the noise effect component to the image data.

4. An image processing method by an image processing apparatus having a shooting processing device configured to execute shooting processing which includes shooting the image of an object and generating the image data of the object, the method comprising:
   obtaining setting information of a noise additional component;
   generating control information related to the shooting processing executed in the shooting processing device; and
   generating a noise effect component with a strength based on the setting information and the control information.

5. A recording medium readable by a computer, recording a program for allowing a computer to execute an image processing method by an image processing apparatus having a shooting processing device for executing shooting processing which includes shooting an image of an object and generating the image data of the object, wherein the image processing method comprises:
   obtaining setting information of a noise additional component;
   generating control information related to the shooting processing executed in the shooting processing device; and
   generating a noise effect component with a strength based on the setting information and the control information.

6. The image processing apparatus according to claim 1, further comprising:
   a recording device configured to record the image data and the noise effect component separately in a recording medium.

7. The image processing apparatus according to claim 2, wherein when the white balance of the image data is shifted toward a color, the noise effect component is shifted toward the color.

8. The image processing apparatus according to claim 2, wherein in a gain-up state, the noise effect component is smaller than that in a non-gain-up state.

9. An image processing apparatus, comprising:
   a shooting processing device configured to execute shooting processing which includes shooting an image of an object and generating an image data of the object;
   an obtaining device configured to obtain setting information of a noise additional component;
   a control information generating device configured to generate control information related to the shooting processing; and
   a generating device configured to generate noise effect information regarding a noise effect component with a strength based on the setting information and the control information.

10. An image processing method by an image processing apparatus having a shooting processing device configured to execute shooting processing which includes shooting the image of an object and generating the image data of the object, the method comprising:
   obtaining setting information of a noise additional component;
   generating control information related to the shooting processing executed in the shooting processing device; and
   generating noise effect information regarding a noise effect components component with a strength based on the setting information and the control information.

11. A recording medium readable by a computer, recording a program for allowing a computer to execute an image processing method by an image processing apparatus having a shooting processing device for executing shooting processing which includes shooting an image of an object and generating the image data of the object, wherein the image processing method comprises:
- obtaining setting information of a noise additional component;
- generating control information related to the shooting processing executed in the shooting processing device; and
- generating noise effect information regarding a noise effect component with a strength based on the setting information and the control information.

12. The image processing apparatus according to claim 2, wherein when the white balance of the image data is shifted toward a color, the noise effect component for the color is larger than the noise effect component for the other colors.

* * * * *